United States Patent
Maalouli et al.

(10) Patent No.: US 10,811,032 B2
(45) Date of Patent: Oct. 20, 2020

(54) DATA AIDED METHOD FOR ROBUST DIRECTION OF ARRIVAL (DOA) ESTIMATION IN THE PRESENCE OF SPATIALLY-COHERENT NOISE INTERFERERS

(71) Applicant: Cirrus Logic International Semiconductor Ltd., Edinburgh (GB)

(72) Inventors: Ghassan Maalouli, Scottsdale, AZ (US); Seth Suppappola, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 152 days.

(21) Appl. No.: 16/225,023

(22) Filed: Dec. 19, 2018

(65) Prior Publication Data

US 2020/0202883 A1    Jun. 25, 2020

(51) Int. Cl.
| | | |
|---|---|---|
| G10L 25/27 | (2013.01) | |
| G10L 25/21 | (2013.01) | |
| G10L 21/028 | (2013.01) | |
| G10L 17/00 | (2013.01) | |
| G10L 25/78 | (2013.01) | |
| G10L 15/08 | (2006.01) | |

(52) U.S. Cl.
CPC ............. *G10L 25/27* (2013.01); *G10L 15/08* (2013.01); *G10L 21/028* (2013.01); *G10L 25/21* (2013.01); *G10L 17/005* (2013.01); *G10L 25/78* (2013.01); *G10L 2015/088* (2013.01)

(58) Field of Classification Search
CPC . G10L 2015/088; G10L 17/005; G10L 17/06; G10L 21/028; G10L 25/25; G10L 25/78; G06K 9/00563

USPC .................. 704/233, 246, 253, 270
See application file for complete search history.

(56) References Cited

U.S. PATENT DOCUMENTS

| | | |
|---|---|---|
| 9,697,831 B2 | 7/2017 | Lesso et al. |
| 9,779,726 B2 | 10/2017 | Hatfield et al. |

(Continued)

OTHER PUBLICATIONS

Dat, et al. "Multichannel speech enhancement based on speech spectral magnitude estimation using generalized gamma prior distribution." 2006 IEEE International Conference on Acoustics Speech and Signal Processing Proceedings. vol. 4. IEEE, 2006, pp. 1149-1152. (Year: 2006).*

(Continued)

*Primary Examiner* — James S Wozniak
(74) *Attorney, Agent, or Firm* — E. Alan Davis; James W. Huffman

(57) ABSTRACT

A method and apparatus to determine a direction of arrival (DOA) of a talker in the presence of a source of spatially-coherent noise. A time sequence of audio samples that include the spatially-coherent noise is received and buffered. Aided by previously known data, a trigger point is detected in the time sequence of audio samples when the talker begins to talk. The buffered time sequence of audio samples is separated into a noise segment and a signal-plus-noise segment based on the trigger point. For each direction of a plurality of distinct directions: an energy difference is computed for the direction between the noise segment and the signal-plus-noise segment, and the DOA of the talker is selected as the direction of the plurality of distinct directions having a largest of the computed energy differences.

21 Claims, 4 Drawing Sheets

(56) References Cited

U.S. PATENT DOCUMENTS

| | | | | |
|---|---|---|---|---|
| 2004/0005064 | A1* | 1/2004 | Griesinger | G01V 1/001 381/17 |
| 2007/0100605 | A1* | 5/2007 | Renevey | G10L 21/0272 704/201 |
| 2009/0285409 | A1* | 11/2009 | Yoshizawa | G01S 3/8083 381/92 |
| 2010/0070274 | A1* | 3/2010 | Cho | G10L 15/20 704/233 |
| 2012/0123772 | A1* | 5/2012 | Thyssen | G10L 21/0272 704/226 |
| 2012/0224456 | A1* | 9/2012 | Visser | G01S 15/876 367/127 |
| 2013/0013303 | A1* | 1/2013 | Strommer | G10L 21/0208 704/226 |
| 2016/0014506 | A1* | 1/2016 | Tanaka | H04R 1/406 381/92 |
| 2017/0076720 | A1* | 3/2017 | Gopalan | G10L 15/22 |
| 2018/0033428 | A1* | 2/2018 | Kim | G10L 15/20 |
| 2018/0033447 | A1* | 2/2018 | Ramprashad | G10L 21/0216 |
| 2018/0190260 | A1* | 7/2018 | Christoph | G10K 11/17861 |
| 2018/0374494 | A1* | 12/2018 | Yamaya | G06K 9/00281 |
| 2019/0108837 | A1* | 4/2019 | Christoph | H04S 7/303 |
| 2019/0273988 | A1* | 9/2019 | Christoph | G10L 21/0216 |
| 2019/0333501 | A1* | 10/2019 | Kurtz | G10L 15/22 |
| 2019/0385635 | A1* | 12/2019 | Shahen Tov | G10L 25/21 |
| 2020/0053486 | A1* | 2/2020 | Jensen | H04R 25/405 |

OTHER PUBLICATIONS

Jarrett, Daniel P., et al. "Noise reduction in the spherical harmonic domain using a tradeoff beamformer and narrowband DOA estimates." IEEE/ACM transactions on audio, speech, and language processing 22.5, Mar. 2014, pp. 967-978. (Year: 2014).*

Trinkle, Matthew et al. "Histogram Based DOA Estimation for Speaker Localisation in Reverberant Environments." 2015 IEEE 10$^{th}$ Conference on Industrial Electronics and Applications (ICIEA). pp. 166-170 Jun. 2015.

Abeida, H. et al. "Data-Aided DOA Estimation of Single Source with Time-Variant Rayleigh Amplitudes." 18$^{th}$ European Signal Processing Conference (EUSIPCO-2010). Aug. 23-27, 2010, Aalborg, Denmark. pp. 1359-1363.

Khmou, Youssef et al. "On Spatially Coherent Noise Field in Narrowband Direction Finding." International Arab Conference on Information Technology (ACIT'2016). pp. 1-10.

* cited by examiner

DATA AIDED METHOD FOR ROBUST DIRECTION OF ARRIVAL (DOA) ESTIMATION IN THE PRESENCE OF SPATIALLY-COHERENT NOISE INTERFERERS

BACKGROUND

Intelligent voice interactive devices are required to work in highly reverberant environments in the presence of diffuse, as well as spatially-coherent, noise sources such as a television (TV), radio, smart speaker, stereo system, or surround sound system. Examples are home automation products that function as personal/virtual assistants. Home automation products have a requirement to estimate direction of arrival (DOA) in a noisy environment as described above. Several DOA estimators, with varied degrees of complexity, exist that can estimate DOA to some degree of accuracy when the noise is diffuse. When the interfering source is spatially-coherent (TV, radio, stereo), the estimator tends to capture the interference, rendering the DOA estimate useless. Therefore, there is a need for a DOA estimator that is computationally efficient and able to function in the presence of spatially-coherent interference.

One particular solution that is efficient but dysfunctional in the presence of spatially-coherent noise is a histogram-based beamformer described in the paper of Trinkle M. and Hashemi-Sakhtsari A., "Histogram Based DOA Estimation for Speaker Localisation in Reverberant Environments," 2015, 10'th Conference on Industrial & Applications, pp 166-170, 2015.

SUMMARY

In one embodiment, the present disclosure provides a method to determine a direction of arrival (DOA) of a talker in the presence of a source of spatially-coherent noise. The method includes receiving and buffering a time sequence of audio samples that include the spatially-coherent noise. The method also includes detecting, aided by previously known data, a trigger point in the time sequence of audio samples when the talker begins to talk. The method also includes separating the buffered time sequence of audio samples into a noise segment and a signal-plus-noise segment based on the trigger point. The method also includes, for each direction of a plurality of distinct directions: computing, for the direction, an energy difference between the noise segment and the signal-plus-noise segment and selecting as the DOA of the talker the direction of the plurality of distinct directions having a largest of the computed energy differences.

In another embodiment, the present disclosure provides an apparatus to determine a direction of arrival (DOA) of a talker in the presence of a source of spatially-coherent noise. The apparatus includes a buffer that stores a received time sequence of audio samples that include the spatially-coherent noise. The apparatus also includes a trigger point detector that detects, aided by previously known data, a trigger point in the time sequence of audio samples when the talker begins to talk. The apparatus also has circuitry configured to separate the buffered time sequence of audio samples into a noise segment and a signal-plus-noise segment based on the trigger point. The circuitry is also configured to, for each direction of a plurality of distinct directions, compute an energy difference between the noise segment and the signal-plus-noise segment. The circuitry is also configured to select as the DOA of the talker the direction of the plurality of distinct directions having a largest of the computed energy differences.

In yet another embodiment, the present disclosure provides a non-transitory computer-readable medium having instructions stored thereon that are capable of causing or configuring an apparatus to determine a direction of arrival (DOA) of a talker in the presence of a source of spatially-coherent noise by performing operations. The operations include receiving and buffering a time sequence of audio samples that include the spatially-coherent noise. The operations also include detecting, aided by previously known data, a trigger point in the time sequence of audio samples when the talker begins to talk. The operations also include separating the buffered time sequence of audio samples into a noise segment and a signal-plus-noise segment based on the trigger point. The operations also include, for each direction of a plurality of distinct directions: computing, for the direction, an energy difference between the noise segment and the signal-plus-noise segment and selecting as the DOA of the talker the direction of the plurality of distinct directions having a largest of the computed energy differences.

DETAILED DESCRIPTION

Embodiments are described of a robust and computationally efficient method that can estimate DOA in the presence of spatially-coherent noise. In the context of the instant disclosure, direction of arrival (DOA) means the direction or bearing from the device to a talker of interest. Data-aided methods that exploit the detection of a trigger point are described. In one embodiment, the aiding data is a keyword (e.g., phrase or single word) the user (also referred to as a talker) utters to initiate communications with the device. In one embodiment, the aiding data is a biometric characteristic of the talker's voice. In one embodiment, the aiding data is knowledge of general characteristics of human speech (e.g., multi-tonal characteristic) as distinguished from non-human audio (e.g., single frequency audio of a dishwasher, washing machine or other appliance). For example, spectrum analysis may be performed or machine learning may be employed to compare received audio with known data of human speech characteristics to detect any talker speaking. Using the aiding data, a trigger point in time is detected that is used to separate a pre-trigger point segment (noise segment) from a post-trigger point segment (signal-plus-noise segment). For both of the segments, an energy difference is computed between the two segments for each of multiple beam spaces. The direction associated with the beam space having the largest energy difference is selected as the DOA. The approach makes use of an early gate/late gate concept. A sufficient number of samples is buffered to include both segments. Preferably, the energy is measured, filtered and normalized in each segment.

Figure 1:
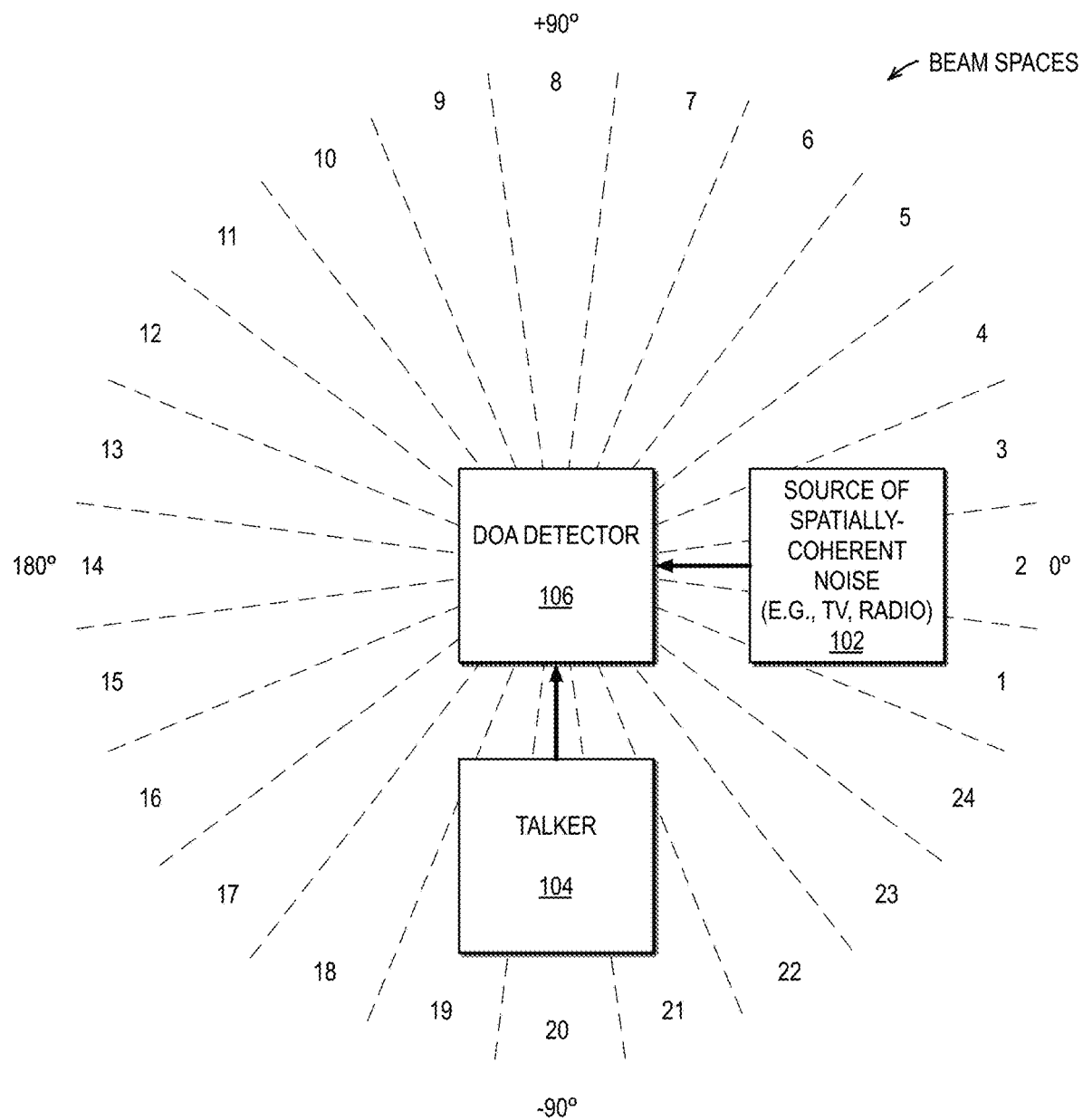
FIG. 1 is a block diagram illustrating a space having a DOA detector that detects a DOA of a talker in the presence of a source of spatially-coherent noise.

Referring now to FIG. 1, a block diagram illustrating a space (e.g., a room or other reverberant location) having a DOA detector 106 that detects a DOA of a talker 104 (e.g., user of the detector 106) in the presence of a source of spatially-coherent noise 102 (e.g., television, radio, stereo). In the context of the instant disclosure, spatially-coherent noise means noise which may be modeled by a finite number of point sources. As shown, the DOA detector 106 effectively divides the space into multiple beam spaces (also referred to as bins or sectors) each having an associated direction (e.g., angular direction relative to a reference angle). In the example embodiment of FIG. 1, there are 24 beam spaces each of 15 degrees, numbered 1 through 24. As indicated in the example of FIG. 1, the predominance of the audio energy generated by the talker 104 is received from the direction associated with beam space 20 at −90 degrees, and the predominance of the audio energy generated by the source of spatially-coherent noise 102 is received from the direction associated with beam space 2 at 0 degrees. Preferably, the DOA detector 106 effectively divides the space into multiple beam spaces by employing a beamformer (e.g., beamformer 208 of FIG. 2). In one embodiment, the beamformer includes an array of microphones or antennas or channels (e.g., four) that receives audio that is mixed and sampled and stored in a buffer (e.g., buffer 202 of FIG. 2). The number of beam spaces and associated directions into which the space is split may vary. For example, twelve different beam spaces of 30 degrees each may be employed to cover a 360-degree space; for another example, 36 different spaces of ten degrees each may be employed. Although FIG. 1 illustrates a single source of spatially-coherent noise 102, embodiments may effectively estimate DOA in the presence of multiple sources of spatially-coherent noise.

Figure 2:
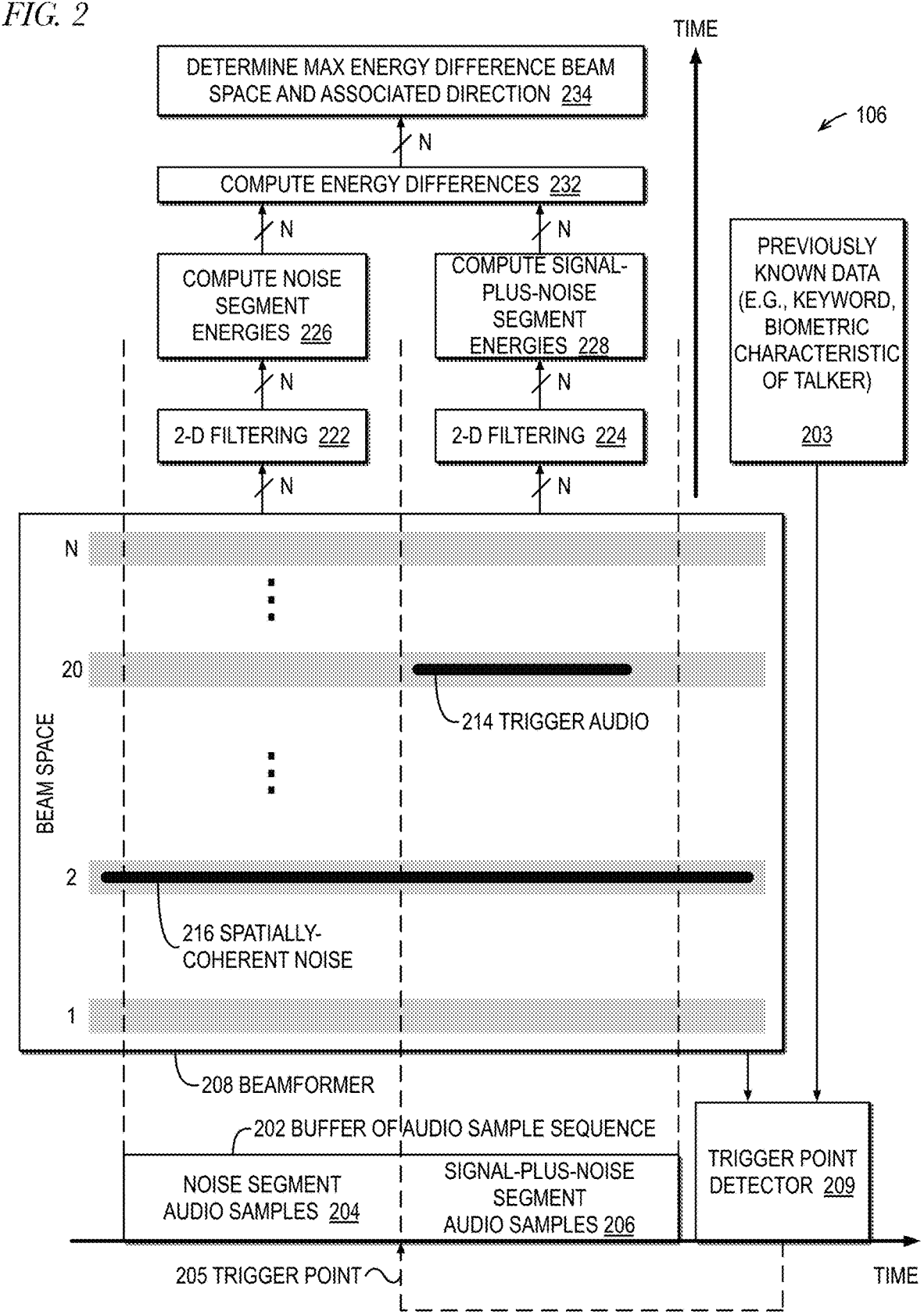
FIG. 2 is a diagram illustrating in more detail an embodiment of the DOA detector 106 of FIG. 1 and its operation.

Referring now to FIG. 2, a diagram illustrating in more detail an embodiment of the DOA detector 106 of FIG. 1 and its operation is shown. The DOA detector 106 includes a buffer 202 that stores a time sequence of audio samples received by the DOA detector 106, previously known data 203 (e.g., keyword or talker biometric characteristic), a beamformer 208 that effectively divides the space into N beam spaces (e.g., the beam spaces 1 through 24 of FIG. 1) according to well-known beamforming techniques, a trigger point detector 209 that determines a trigger point 205 in the time sequence of audio samples stored in the buffer 202, and blocks to perform various operations, including 2-dimensional filtering 222/224, segment energy computation 226/228, energy difference computation 232, and determination of which beam space has the maximum energy difference between its noise segment and signal-plus-noise segment 234. The DOA detector 106 may include a memory and a programmable processor that executes software to perform the various functions described, application-specific hardware, or a combination thereof.

As shown, time proceeds from left to right in FIG. 2 to the point of trigger detection and separation of the time sequence of audio samples into a noise segment 204 and a signal-plus-noise segment 206, described in more detail below. The DOA detector 106 continually buffers audio samples received from the surrounding space into the buffer 202 over time. The audio samples may include diffuse noise (not shown) received on many of the beam spaces. The received audio may also include spatially-coherent noise 216 (e.g., generated by the source of spatially-coherent noise 102 of FIG. 1), shown in FIG. 2 as primarily being received from beam space 2. However, it should be understood that non-negligible portions of the energy of the spatially-coherent noise 216 may be received from beam spaces adjacent to beam space 2. The trigger point detector 209 uses the previously known data 203 to continually analyze the received audio samples to detect the trigger point 205, i.e., the point in time at which the talker 104 begins to speak.

At some point in time, the talker 104 begins to talk and the talker's audio is received, shown as trigger audio 214, and captured in the buffer 202. In the example, beam space 20 receives most of the energy of the trigger audio 214, as shown. As the trigger point detector 209 analyzes the audio samples in the buffer 202 aided by the previously known data 203, the trigger point detector 209 eventually detects a trigger point 205. More specifically, the trigger point detector 209 detects the point in time approximately at which the talker 104 begins to speak with respect to the buffered audio samples. In the example of FIG. 2, the detected trigger point 205 is slightly before the time the talker 104 begins to talk. The trigger point 205 is used to separate the buffered audio samples into the noise segment 204 and the signal-plus-noise segment 206. Detection of the trigger point 205 is advantageous because it enables DOA determination based on computation of the energy difference in the different beam spaces before and after the trigger point 205, which may significantly improve DOA estimation in the presence of a spatially-coherent noise source over conventional DOA detectors.

The trigger point detector 209 may detect the trigger point 205 as the presence of a keyword in the buffer 202 of audio samples that matches a keyword stored in the previously known data 203. As described above, a keyword may include one or more words, e.g., a single word or a phrase (e.g., "My command is"). The trigger point detector 209 may detect the trigger point 205 as the presence of a biometric characteristic of the talker 104 in the buffer 202 of audio samples that matches a biometric characteristic stored in the previously known data 203. Biometric data is a set of unique features that are extracted from a speech signal and is used to identify a talker in a speech identification system. The trigger point detector 209 may detect the trigger point 205 as simply the presence of human speech spoken by any talker 104 in the buffer 202 of audio samples based on extracted speech features stored in the previously known data 203 (e.g., according to the embodiment of FIG. 5).

After detection of the trigger point 205, the audio samples captured in the buffer 202 are separated into the noise segment 204 and the signal-plus-noise segment 206 based on the trigger point 205. That is, the audio samples in the buffer 202 captured prior to the trigger point 205 are included in the noise segment 204, and the audio samples in the buffer 202 captured after the trigger point 205 are included in the signal-plus-noise segment 206. The audio samples in each of the segments 204/206 are then separated into the different N beam spaces. In an alternate embodiment, the audio samples in each of the segments 204/206 may be separated into the different N beam spaces prior to detection of the trigger point 205 and/or prior to separation of the audio samples into the noise segment 204 and the signal-plus-noise segment 206.

After separation into the noise segment 204 and the signal-plus-noise segment 206, time proceeds upward, as shown. 2-dimensional (2-D) filtering 222 is performed on the noise segment audio samples 204 for the N beam segments, and 2-dimensional (2-D) filtering 224 is performed on the signal-plus-noise segment audio samples 206 for the N beam segments. The filtering may be employed to clean up the sampled audio in both time and spatial dimensions to obtain a more consistent result and to enhance energy difference detection. For example, time filtering may include filling in blank samples or median filtering in which successive time samples are averaged (e.g., three successive time samples). For example, spatial filtering may include averaging the energy of a beam and its adjacent beams to combat a phenomenon commonly referred to as picket-fencing in which the energy may be divided between different beams. The filtering may include smoothing, linear filtering, non-linear filtering (e.g., median filtering), averaging, or other pre-processing. In one embodiment, the two-dimensional filtering is performed on each of the N beam spaces.

After filtering, a computation 226 of the energy of the noise segment 204 for the N beams is performed on the filtered samples, and a computation 228 of the energy of the signal-plus-noise segment 206 for the N beams is performed on the filtered samples. In one embodiment, the energy computations 226 and 228 comprise computation of a mean energy for each beam space/segment pair. Subsequently, a computation 232 is performed of the difference between the computed energies of the noise segment 204 and the signal-plus-noise segment 206 for the N beam spaces. In one embodiment, the energy difference computation 232 comprises computation for each of the N beam spaces of a gradient between the mean energy computations of the noise segment 204 and the signal-plus-noise segment 206. Finally, a determination 234 is made of the beam space of the N beam spaces having the largest computed energy difference and its associated direction as the estimated DOA. In one embodiment, the largest computed energy difference determination comprises selecting the beam space having the largest computed energy gradient and its associated direction. The selection of the direction with the maximum energy difference may take various forms and may also include filtering. For example, assuming the DOA detector 106 returns a DOA answer once each second, the DOA detector 106 may determine ten different directions having the largest energy difference during ten successive 100 millisecond periods and then select the direction having the greatest number of largest energy differences of the ten as the DOA.

Although the audio samples are separated into the different beam spaces in order to determine the beam space with the maximum pre/post-trigger point energy difference, detection of the trigger point 205 may be performed by various means, and the audio samples need not be separated into the different beam spaces to perform trigger point detection.

Figure 3:
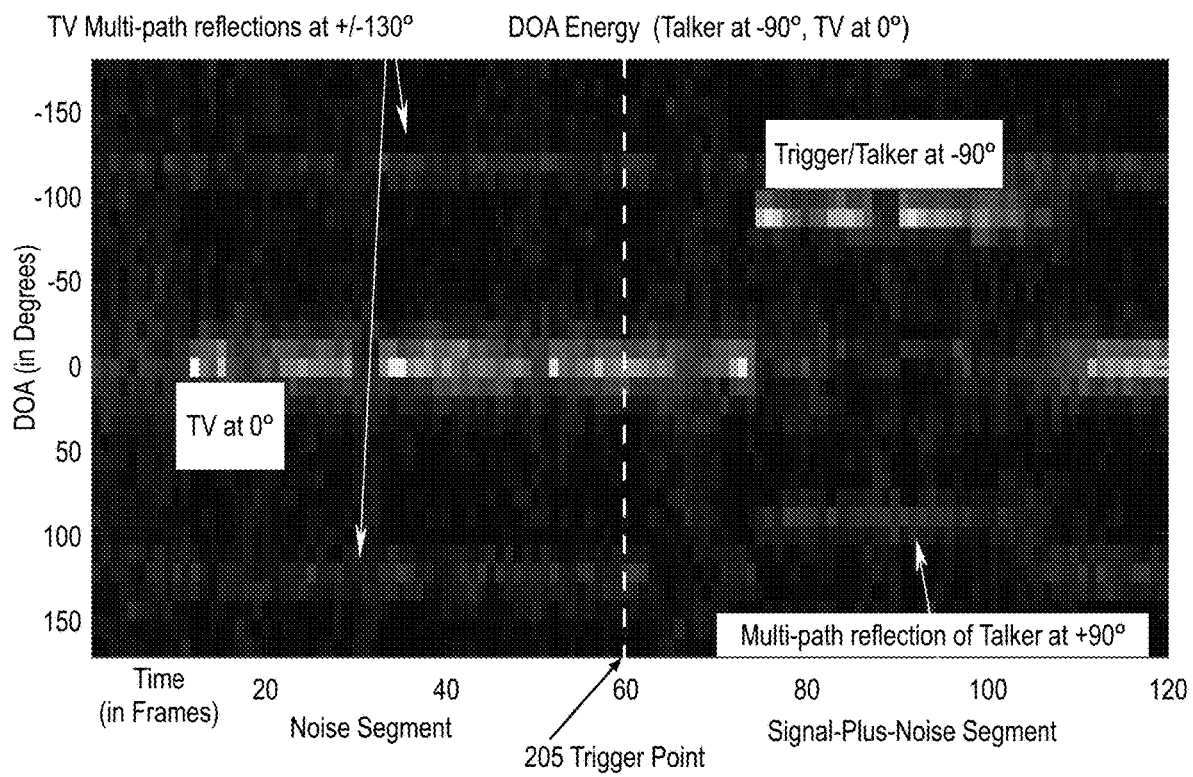
FIG. 3 is an energy density graph illustrating operation of the DOA detector of FIG. 1 in the presence of a spatially-coherent noise source.

Referring now to FIG. 3, an energy density graph illustrating operation of the DOA detector 106 of FIG. 1 in the presence of a spatially-coherent noise source is shown. Time in frames is represented on the horizontal axis, and 120 frames are shown in the example. Direction is represented on the vertical axis with angles ranging from approximately −180 degrees to +180 degrees. The energy density of an audio sample at each time/direction pair is indicated by the brightness of the associated pixel in the graph. Brighter pixels correspond to higher energy audio samples, whereas darker pixels correspond to lower energy audio samples. As may be observed from the pixilation of FIG. 3, the beamformer 208 effectively separated the space into beam spaces of approximately ten degrees each. As shown, a trigger point 205 was detected at approximately frame 60, such that audio samples in frames 0 through 60 are included in the noise segment 204, and audio samples in frames 61 through 120 are included in the signal-plus-noise segment 206.

As may be observed in FIG. 3, a television, functioning as a dominant spatially-coherent interferer 102, is located at 0 degrees. The spatially-coherent noise of the television persists through most of the time frames, as indicated by the high concentration of bright pixels between approximately −20 degrees to +20 degrees and particularly at 0 degrees, although as shown the energy from the television drops out significantly between approximately frames 75 and 105 (e.g., brief relative silence and/or lack of speech, which may be typical of audio generated by a television). Two relatively strong multipath reflections are also clearly visible in FIG. 3 at approximately −120 degrees and +120 degrees. Later in time (at approximately frame 70), a talker 104 located at −90 degrees utters (through approximately frame 110) a trigger, e.g., keyword, talker biometric characteristic, and/or simply human speech, as indicated by the high concentration of bright pixels between approximately −100 degrees to −80 degrees and particularly at −90 degrees. A multi-path reflection of the talker 104 is also observed at approximately +90 degrees.

Figure 4:
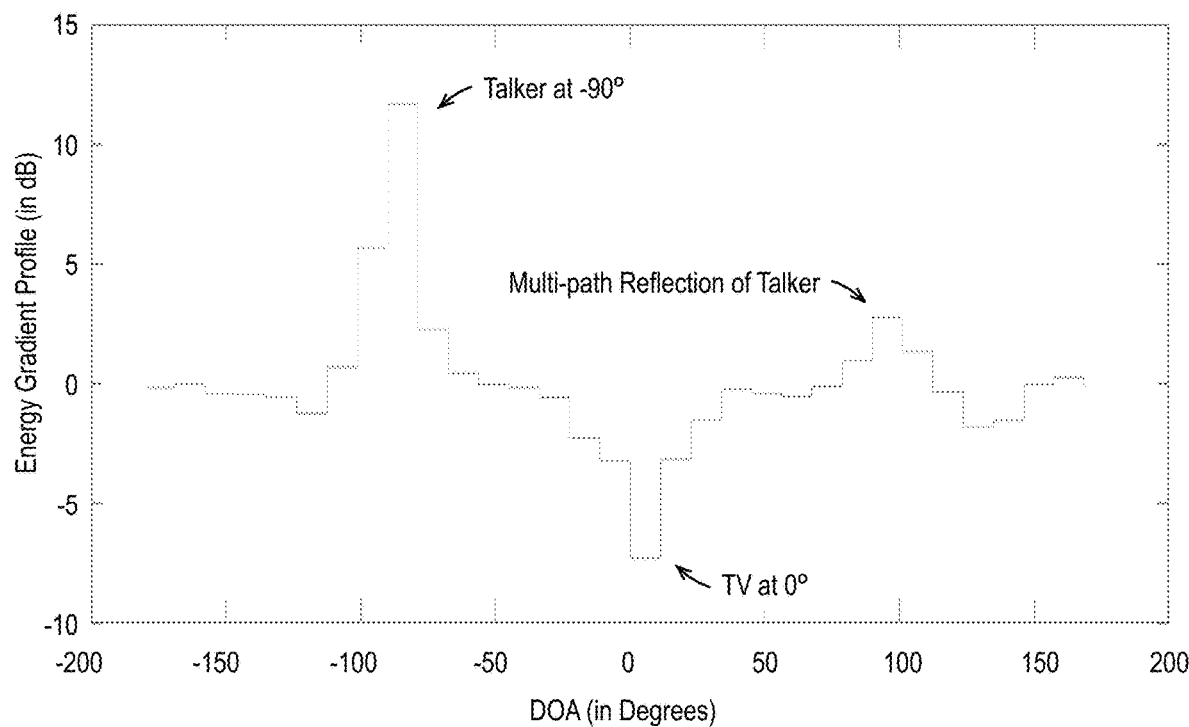
FIG. 4 is an energy profile graph based on the energy density graph of FIG. 3 and illustrating operation of the DOA detector of FIG. 1 in the presence of a spatially-coherent noise source.

Referring now to FIG. 4, an energy profile graph based on the energy density graph of FIG. 3 and illustrating operation of the DOA detector 106 of FIG. 1 in the presence of a spatially-coherent noise source is shown. Direction in degrees is represented on the horizontal axis and corresponds to the direction in degrees on the vertical axis of FIG. 3. A comparison of the computed energy difference pre/post-trigger point 205 is represented on the vertical axis. In the embodiment of FIG. 4, the vertical axis corresponds to a ratio in dB of the energy of audio samples in the signal-plus-noise segment 206 and the energy of audio samples in the noise segment 204 for the N different beam spaces. As may be observed from FIG. 4, in the example, each beam space is approximately ten degrees.

For directions in which the received energy does not significantly change before and after the trigger point 205, the energy difference is approximately 0 dB, which in the example are directions other than the direction of the talker (−90 degrees), the TV (0 degrees) and the multipath reflection of the talker 104 (+90 degrees). FIG. 4 demonstrates the ability of the DOA detector 106 to filter out the TV interferer 102 at 0 degrees and estimate the presence of the desired talker 104 at −90 degrees by selecting the beam space having the largest energy difference before and after the trigger point, which is readily observable from FIG. 4. In particular, the computed energy difference of the multi-path reflection of the talker 104 is significant, but significantly smaller than the computed energy difference received from the direction of the desired talker 104.

Figure 5:
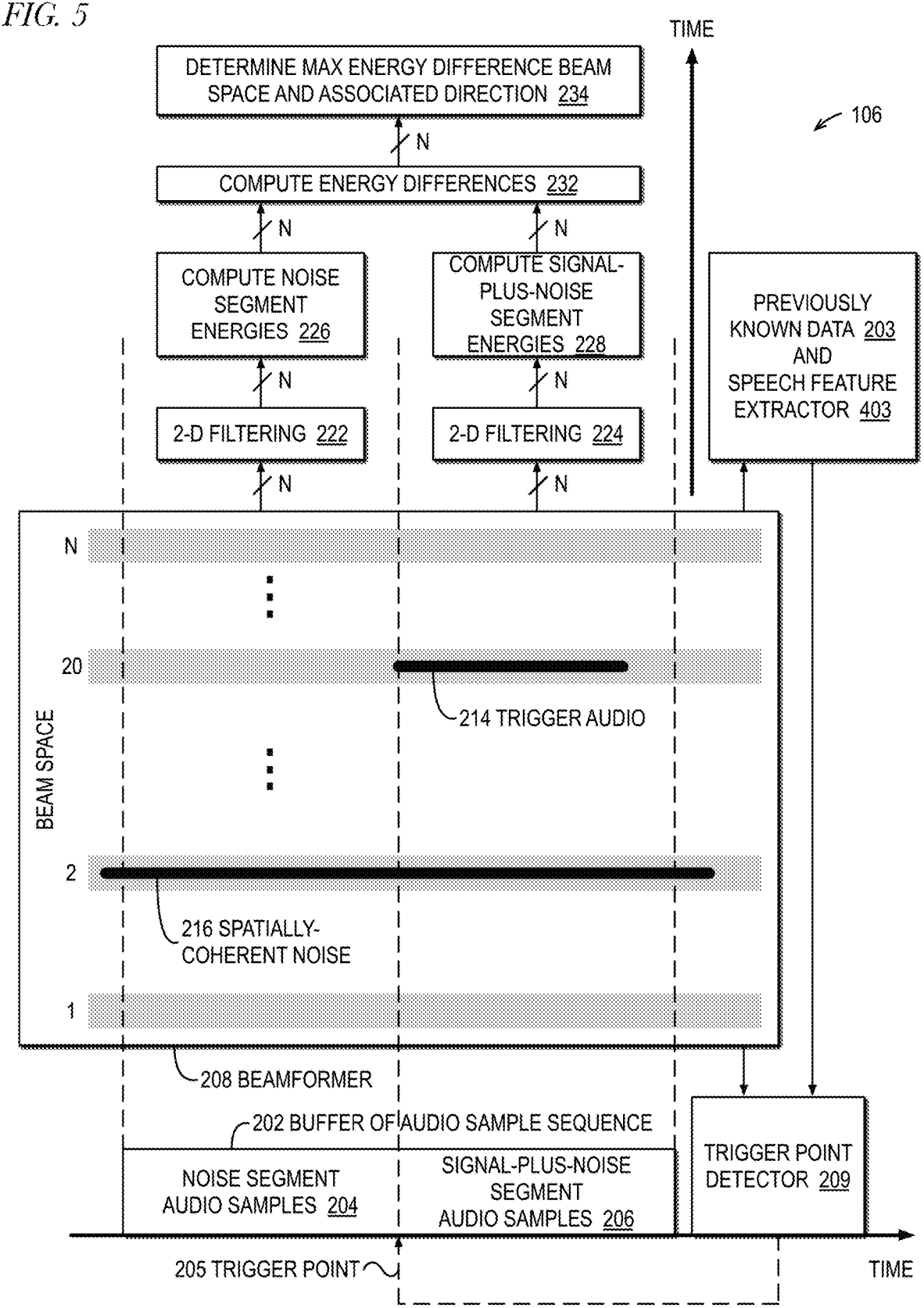
FIG. 5 is a diagram illustrating in more detail an alternate embodiment of the DOA detector of FIG. 1 and its operation.

Referring now to FIG. 5, a diagram illustrating in more detail an alternate embodiment of the DOA detector 106 of FIG. 1 and its operation is shown. The DOA detector 106 of FIG. 5 is similar in many respects to the DOA detector 106 of FIG. 2 and like-numbered elements are similar. However, in addition to the previously known data 203 of FIG. 2, the DOA detector 106 of FIG. 5 includes a speech feature extractor 403. The speech feature extractor 403 extracts features from the audio samples and provides the extracted features to the trigger point detector 209 in addition to the known data. The trigger point detector 209 detects a trigger point 205 if it detects the presence of any human speech from the known data and the extracted features. One class of extracted features is derived by well-known spectral analysis techniques, e.g., Mel Frequency Coefficients (MFCC), Line Spectral Frequencies (LSF) and Pitch frequency, among others. Another class of extracted features are generated by machine learning algorithms.

In the presence of a spatially-coherent noise source that includes human speech (e.g., a television, stereo, radio), embodiments in which the data-aided trigger point detection comprises detecting the talker speaking a keyword or detecting a biometric characteristic of the talker may be more effective than conventional DOA detectors at determining DOA. In the presence of a spatially-coherent noise source that does not include human speech (e.g., dishwasher, hair dryer, washing machine), embodiments in which the data-aided trigger point detection comprises using frequency analysis to detect the presence of any spoken human text (e.g., multi-tonal audio) may also be more effective than conventional DOA detectors at determining DOA.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method to determine a direction of arrival (DOA) of a talker in the presence of a source of spatially-coherent noise, the method comprising:

receiving and buffering a time sequence of audio samples that include the spatially-coherent noise;
detecting, aided by previously known data, a trigger point in the time sequence of audio samples when the talker begins to talk;
separating the buffered time sequence of audio samples into a noise segment and a signal-plus-noise segment based on the trigger point;
for each direction of a plurality of distinct directions:
computing, for the direction, an energy difference between the noise segment and the signal-plus-noise segment; and
selecting as the DOA of the talker the direction of the plurality of distinct directions having a largest of the computed energy differences.

2. The method of claim 1,
wherein the previously known data comprises a keyword spoken by the talker.

3. The method of claim 1,
wherein the previously known data comprises a biometric characteristic of the talker.

4. The method of claim 1,
wherein said detecting, aided by the previously known data, the trigger point in the time sequence of audio samples when the talker begins to talk comprises:
extracting speech features from the time sequence of audio samples; and
detecting when the time sequence of audio samples includes spoken human text using the extracted speech features.

5. The method of claim 1, further comprising:
beamforming to separate the time sequence of audio samples into the plurality of distinct directions.

6. The method of claim 1, further comprising:
filtering the time sequence of audio samples in a time dimension and a spatial dimension; and
wherein the energy differences are computed for each direction of the plurality of distinct directions using a result of said filtering.

7. The method of claim 1, further comprising:
for each direction of the plurality of distinct directions:
calculating a mean energy during the noise segment for the direction;
calculating a mean energy during the signal-plus-noise segment for the direction; and
wherein said computing the energy difference for the direction comprises:
computing an energy gradient between the calculated mean energy during the noise segment for the direction and the calculated mean energy during the signal-plus-noise segment for the direction; and
wherein said selecting as the DOA of the talker the direction of the plurality of distinct directions having the largest of the computed energy differences comprises selecting as the DOA of the talker the direction of the plurality of distinct directions having a largest of the computed energy gradients.

8. An apparatus to determine a direction of arrival (DOA) of a talker in the presence of a source of spatially-coherent noise, comprising:
a buffer that stores a received time sequence of audio samples that include the spatially-coherent noise;
a trigger point detector that detects, aided by previously known data, a trigger point in the time sequence of audio samples when the talker begins to talk;
circuitry configured to:

separate the buffered time sequence of audio samples into a noise segment and a signal-plus-noise segment based on the trigger point;

for each direction of a plurality of distinct directions, compute an energy difference between the noise segment and the signal-plus-noise segment for the direction; and select as the DOA of the talker the direction of the plurality of distinct directions having a largest of the computed energy differences.

9. The apparatus of claim 8,
wherein the previously known data comprises a keyword spoken by the talker.

10. The apparatus of claim 8,
wherein the previously known data comprises a biometric characteristic of the talker.

11. The apparatus of claim 8,
wherein to detect, aided by the previously known data, the trigger point in the time sequence of audio samples when the talker begins to talk, the circuitry:
extracts speech features from the time sequence of audio samples; and
detects when the time sequence of audio samples includes spoken human text using the extracted speech features.

12. The apparatus of claim 8, further comprising:
a beamformer configured to separate the time sequence of audio samples into the plurality of distinct directions.

13. The apparatus of claim 8,
wherein the circuitry is further configured to filter the time sequence of audio samples in a time dimension and a spatial dimension; and
wherein the energy differences are computed for each direction of the plurality of distinct directions using a result of said filtering.

14. The apparatus of claim 8,
wherein the circuitry is further configured to:
for each direction of the plurality of distinct directions:
calculate a mean energy during the noise segment for the direction;
calculate a mean energy during the signal-plus-noise segment for the direction; and
wherein to compute the energy difference for the direction, the circuitry computes an energy gradient between the calculated mean energy during the noise segment for the direction and the calculated mean energy during the signal-plus-noise segment for the direction; and
wherein to select as the DOA of the talker the direction of the plurality of distinct directions having the largest of the computed energy differences, the circuitry computes as the DOA of the talker the direction of the plurality of distinct directions having a largest of the computed energy gradients.

15. A non-transitory computer-readable medium having instructions stored thereon that are capable of causing or configuring an apparatus to determine a direction of arrival (DOA) of a talker in the presence of a source of spatially-coherent noise by performing operations comprising:
receiving and buffering a time sequence of audio samples that include the spatially-coherent noise;
detecting, aided by previously known data, a trigger point in the time sequence of audio samples when the talker begins to talk;
separating the buffered time sequence of audio samples into a noise segment and a signal-plus-noise segment based on the trigger point;
for each direction of a plurality of distinct directions:
computing, for the direction, an energy difference between the noise segment and the signal-plus-noise segment; and
selecting as the DOA of the talker the direction of the plurality of distinct directions having a largest of the computed energy differences.

16. The non-transitory computer-readable medium of claim 15,
wherein the previously known data comprises a keyword spoken by the talker.

17. The non-transitory computer-readable medium of claim 15,
wherein the previously known data comprises a biometric characteristic of the talker.

18. The non-transitory computer-readable medium of claim 15,
wherein said detecting, aided by the previously known data, the trigger point in the time sequence of audio samples when the talker begins to talk comprises:
extracting speech features from the time sequence of audio samples; and
detecting when the time sequence of audio samples includes spoken human text using the extracted speech features.

19. The non-transitory computer-readable medium of claim 15, wherein the operations further comprise:
beamforming to separate the time sequence of audio samples into the plurality of distinct directions.

20. The non-transitory computer-readable medium of claim 15, wherein the operations further comprise:
filtering the time sequence of audio samples in a time dimension and a spatial dimension; and
wherein the energy differences are computed for each direction of the plurality of distinct directions using a result of said filtering.

21. The non-transitory computer-readable medium of claim 15, wherein the operations further comprise:
for each direction of the plurality of distinct directions:
calculating a mean energy during the noise segment for the direction;
calculating a mean energy during the signal-plus-noise segment for the direction; and
wherein said computing the energy difference for the direction comprises:
computing an energy gradient between the calculated mean energy during the noise segment for the direction and the calculated mean energy during the signal-plus-noise segment for the direction; and
wherein said selecting as the DOA of the talker the direction of the plurality of distinct directions having the largest of the computed energy differences comprises selecting as the DOA of the talker the direction of the plurality of distinct directions having a largest of the computed energy gradients.

\* \* \* \* \*